US012759936B2

(12) United States Patent
Aldabaibeh et al.

(10) Patent No.: US 12,759,936 B2
(45) Date of Patent: Oct. 13, 2026

(54) GYPSUM SET ACCELERATOR

(71) Applicant: KNAUF GIPS KG, Iphofen (DE)

(72) Inventors: Naser Aldabaibeh, Homer Glen, IL (US); Mark Antosh, Wheeling, IL (US); Mark Hemphill, Hawthron Woods, IL (US)

(73) Assignee: KNAUF GIPS KG, Iphofen (DE)

(*) Notice: Subject to any disclaimer, the term of this patent is extended or adjusted under 35 U.S.C. 154(b) by 622 days.

(21) Appl. No.: 17/978,406

(22) Filed: Nov. 1, 2022

(65) Prior Publication Data

US 2023/0339811 A1 Oct. 26, 2023

Related U.S. Application Data

(60) Provisional application No. 63/332,753, filed on Apr. 20, 2022.

(51) Int. Cl.

| | |
|---|---|
| ***C04B 24/26*** | (2006.01) |
| ***C04B 11/00*** | (2006.01) |
| ***C04B 28/04*** | (2006.01) |
| ***C04B 28/14*** | (2006.01) |
| *C04B 103/12* | (2006.01) |

(52) U.S. Cl.

CPC .......... *C04B 24/267* (2013.01); *C04B 11/007* (2013.01); *C04B 28/141* (2013.01); *C04B 2103/12* (2013.01)

(58) Field of Classification Search

CPC ... C04B 24/267; C04B 11/007; C04B 28/141; C04B 2103/12; C04B 2111/0062; C04B 40/0039; C04B 28/14

See application file for complete search history.

(56) References Cited

U.S. PATENT DOCUMENTS

| | | | |
|---|---|---|---|
| 2,078,199 | A | 4/1937 | King et al. |
| 3,573,947 | A | 4/1971 | Kinkade et al. |
| 3,813,312 | A | 5/1974 | Kinkade et al. |
| 4,681,644 | A | 7/1987 | Dozsa |
| 5,643,510 | A | 7/1997 | Sucech |
| 5,683,635 | A | 11/1997 | Sucech et al. |
| 5,798,425 | A | 8/1998 | Albrecht et al. |

(Continued)

FOREIGN PATENT DOCUMENTS

| | | | |
|---|---|---|---|
| CN | 104556809 | A | 4/2015 |
| WO | WO2006133933 | A2 | 12/2006 |

(Continued)

OTHER PUBLICATIONS

PCT Search Report and Written Opinion dated Aug. 1, 2023 for PCT Application No. PCT/US2023/018652.

*Primary Examiner* — Anthony J Green
*Assistant Examiner* — Anastasia A. Kuvayskaya
(74) *Attorney, Agent, or Firm* — Greer, Burns & Crain, Ltd; Pradip Sahu

(57) ABSTRACT

Provided are a gypsum set accelerator wherein the gypsum set accelerator is a dry-milled mixture comprising calcium sulfate dihydrate co-ground with one or more of the following: a polycarboxylic ether (PCE) and/or a sulfonated melamine polycondensate (SMP), gypsum slurries formulated with the gypsum set accelerator and methods for producing the gypsum set accelerator and manufacturing gypsum products with the gypsum set accelerator.

18 Claims, 3 Drawing Sheets

(56) References Cited

U.S. PATENT DOCUMENTS

| | | | |
|---|---|---|---|
| 6,221,151 B1 | 4/2001 | Campbell et al. | |
| 6,379,458 B1 | 4/2002 | Immordino et al. | |
| 6,409,823 B1 | 6/2002 | Shake et al. | |
| 6,777,517 B1 | 8/2004 | Albrecht et al. | |
| 6,783,587 B2 | 8/2004 | Sethuraman et al. | |
| 7,718,019 B2 | 5/2010 | Wittbold et al. | |
| 7,767,019 B2 | 8/2010 | Liu et al. | |
| 7,803,226 B2 | 9/2010 | Wang et al. | |
| 7,892,472 B2 | 2/2011 | Veeramasuneni et al. | |
| 9,255,032 B2 * | 2/2016 | Müller | C04B 28/16 |
| 10,737,979 B2 | 8/2020 | Lu et al. | |
| 2001/0028886 A1 | 10/2001 | Robert et al. | |
| 2008/0160340 A1 * | 7/2008 | Stocco | E04C 2/043<br>156/39 |
| 2011/0054053 A1 | 3/2011 | Lee et al. | |
| 2012/0090508 A1 * | 4/2012 | Groza | C04B 40/0039<br>106/778 |
| 2012/0160133 A1 | 6/2012 | Veeramasuneni et al. | |
| 2016/0376191 A1 | 12/2016 | Li et al. | |
| 2018/0099908 A1 | 4/2018 | Emami et al. | |
| 2019/0322584 A1 | 10/2019 | Sang et al. | |

FOREIGN PATENT DOCUMENTS

| | | | | |
|---|---|---|---|---|
| WO | WO-2006138277 A2 * | 12/2006 | | C04B 11/00 |
| WO | WO2011028817 A1 | 3/2011 | | |

* cited by examiner

GYPSUM SET ACCELERATOR

CROSS-REFERENCE TO RELATED APPLICATIONS

This application claims the benefit of priority to U.S. Provisional Patent Application 63/332,753 filed on Apr. 20, 2022, the entire disclosure of which is herein incorporated by reference in its entirety.

TECHNICAL FIELD

This disclosure relates to building construction products and methods, including an additive for accelerating the setting reaction of calcined gypsum in an aqueous slurry, and related gypsum panels and manufacturing methods.

BACKGROUND

Gypsum panels and other products containing set gypsum are commonly used in building construction, including wallboard, fiberboards, cementitious panels, fiberglass-mat panels, floor underlayment, molded (sculptured) elements, floor underlayment and many others.

Manufacturing of gypsum products may include mixing calcined gypsum with water and additives into a gypsum slurry and then forming a product from the gypsum slurry which sets as calcined gypsum reacts with water and rehydrates. Various methods are known in the art for controlling the setting reaction in the gypsum slurry by which calcined gypsum (calcium sulfate hemihydrate) interacts with water molecules and re-hydrates into calcium sulfate dehydrate crystals, causing the gypsum slurry to set (harden) into an interwoven matrix of set gypsum.

This setting reaction can be described with the following equation:

$$CaSO_4 \cdot \frac{1}{2}H_2O + 3/2H_2O \rightarrow CaSO_4 \cdot 2H_2O$$

Typically, a gypsum slurry is formulated with one or more set accelerators which accelerate the setting reaction and help in regulating a time-period by which the gypsum slurry has hardened sufficiently and can be cut into gypsum panels or removed from the mold. It has been recognized in the field that dry calcium sulfate dihydrate when supplied as freshly ground landplaster works well as an accelerator for setting a calcined gypsum slurry. However, the set accelerator is prone to losing its efficiency rapidly during handling and storage, known as aging, and especially when exposed to humidity, moisture, water and/or heat. Yet, the exposure to humidity and/or heat cannot be easily avoided, especially because a grinding process by which the accelerator is produced from landplaster in a ball mill generates heat, and further because a gypsum slurry may warm up significantly during setting as the setting reaction is an exothermic reaction.

Various compounds and mixtures have been developed as grinding aids in order to minimize aging and improve the efficiency of the calcium sulfate dihydrate accelerator. One example is the climate stabilized accelerator ("CSA") which may contain about 95% of calcium sulfate dihydrate co-ground with 5% sugar and then heat processed, as was originally described in U.S. Pat. No. 3,573,947. Another example is a heat resistance accelerator ("HRA") which comprises calcium sulfate dihydrate freshly co-ground with sugar, e.g., sucrose or dextrose at a ratio of about 5 to about 25 pounds of sugar per 100 pounds of calcium sulfate dihydrate, as was originally described in U.S. Pat. No. 2,078,199.

U.S. Pat. No. 6,409,823, the entire disclosure of which is herein incorporated by reference, discloses a gypsum set accelerator combined with a bisulfate salt. The gypsum set accelerator is calcium sulfate dihydrate ground with sugar, a starch and/or boric acid.

U.S. Pat. No. 6,379,458, the entire disclosure of which is herein incorporated by reference, discloses a set accelerator for at least one of accelerating the hydration rate and reducing the set time of an aqueous slurry of calcium sulfate hemihydrate. The set accelerator consists of a mixture of ground calcium sulfate dihydrate and a zinc sulfate material.

U.S. Patent Publication 2019/0322584, the entire disclosure of which is herein incorporated by reference, discloses an accelerator for accelerating the rate of hydration of calcined gypsum, the set accelerator comprises calcium sulfate dihydrate and a starch.

U.S. Pat. No. 10,737,979, the entire disclosure of which is herein incorporated by reference, discloses a modified gypsum set accelerator which includes dry loose finely ground particles of a mixture of ground dry calcium sulfate dihydrate and a grinding aid selected from one or more of beta-naphthalene sulfonate formaldehyde condensate, trimetaphosphate phosphonate salt, tripolyphosphate salt, tetra-pyrophosphate salt, and pregelatinized starch.

While these grinding aids may help somewhat in protecting a dry-milled gypsum set accelerator, there remains the need in the field for gypsum set accelerators that are less susceptible to aging and retain their set efficiency for a longer period of time.

SUMMARY

This disclosure provides a gypsum set accelerator, wherein the gypsum set accelerator is a dry-milled mixture comprising calcium sulfate dihydrate co-ground with one or more of the following: a polycarboxylic ether ("PCE") and/or sulfonated melamine polycondensate ("SMP").

In the first aspect, this disclosure provides a gypsum set accelerator, wherein the gypsum set accelerator is a dry-milled mixture comprising calcium sulfate dihydrate co-ground with one or more of the following: a polycarboxylic ether (PCE) and/or sulfonated melamine polycondensate (SMP). In some embodiments, the gypsum set accelerator may comprise from 0.1 to 5 parts by weight of the PCE and/or SMP per 100 parts by weight of calcium sulfate dihydrate, and preferably the gypsum set accelerator may comprise from 1 to 2 parts by weight of the PCE and/or SMP per 100 parts by weight of calcium sulfate dihydrate. Preferably, the gypsum set accelerator does not contain starch or sugar.

The gypsum set accelerators include those in which calcium sulfate dihydrate is sourced as mined gypsum, synthetic gypsum, re-hydrated calcined gypsum and/or scrap gypsum wallboard.

In some preferred embodiments, the gypsum set accelerators include those, wherein the polycarboxylate ether contains a mono-carboxylate repeating unit. In some embodiments, the co-polymer may have a charge density in the range from about 300 to about 3000 μequiv charges/g co-polymer.

In one preferred embodiment, the polycarboxylate ether may be a co-polymer composed of oxyalkylene-alkyl ether, maleic acid and acrylic acid repeating units, and having a molecular weight in the range from 20,000 to 80,000 Daltons. The gypsum set accelerators may contain the co-polymer which has a charge density in the range from about 600 to about 2000 μequiv charges/g co-polymer.

In the second aspect, this disclosure provides a method for producing the gypsum set accelerator according to this disclosure, the method comprising:

i) mixing a dry mixture comprising calcium sulfate dihydrate and one or more of the following: a polycarboxylic ether (PCE) and/or sulfonated melamine polycondensate (SMP), wherein calcium sulfate dihydrate is mixed with the PCE and/or SMP in a weight ratio in the range from 1 to 5 parts by weight of the PCE and/or SMP per 100 parts by weight of calcium sulfate dihydrate; and ii) co-grinding the dry mixture in a ball mill.

In this method, steps (i) and (ii) may be carried out sequentially or simultaneously.

The method embodiments include those, wherein calcium sulfate dihydrate is sourced as gypsum, gypsum, landplaster, synthetic gypsum and/or rehydrated calcined gypsum. In some embodiments, the co-grinding in step (ii) may be performed without adding starch or sugar. In some embodiments, the co-grinding in step (ii) may be performed at a temperature in the range from 60° F. to 160° F. In some embodiments, the ball mill may contain grinding balls with an average diameter in the range from about 10 mm to about 50 mm. In some embodiments of the method, the co-grinding in step (ii) may be performed for a period of time in the range 5 minutes to 2 hours.

In the third aspect, this disclosure provides a gypsum slurry comprising at least calcined gypsum, water and the gypsum set accelerator according to this disclosure. Some preferred embodiments of the gypsum slurry include those, wherein the gypsum slurry is further characterized by one or more of the following features:

1) the gypsum set accelerator is in an amount in the range from about 0.1 wt % to about 5 wt % calculated based on the weight of calcined gypsum;

2) a water/stucco ratio is in the range from about 0.4 to about 1.5;

3) the gypsum slurry contains one or more additives; and/or 3) the gypsum set accelerator was aged before it was added to a gypsum slurry.

In the fourth aspect, this disclosure provide a method for manufacturing a gypsum-containing product, the method comprising:

i) mixing a dry mixture comprising calcium sulfate dihydrate and one or more of the following: a polycarboxylic ether (PCE) and/or sulfonated melamine polycondensate (SMP), wherein calcium sulfate dihydrate is mixed with the PCE and/or SMP in a weight ratio in the range from 0.1 to 5 parts by weight of the PCE and/or SMP per 100 parts by weight of calcium sulfate dihydrate;

ii) co-grinding the dry mixture in a ball mill and producing a freshly ground gypsum set accelerator;

iii) mixing at least calcined gypsum, water and the gypsum set accelerator obtained in step ii) into a gypsum slurry with a water/stucco ratio in the range from about 0.4 to about 1.5, wherein the gypsum set accelerator is mixed into the gypsum slurry either as a freshly ground gypsum set accelerator or after the gypsum set accelerator was aged, and wherein the gypsum set accelerator is added to the gypsum slurry in an amount in the range from about 0.1 wt % to about 5 wt % calculated based on the weight of calcined gypsum; and iv) forming a gypsum product from the gypsum slurry.

In some embodiments of this method, the forming of the gypsum product step (iv) may include spreading the gypsum slurry on a first cover sheet moving on a conveyor and covering the spread gypsum slurry with a second cover sheet as the gypsum slurry is conveyed on the first cover sheet.

DETAILED DESCRIPTION

Figure 1:
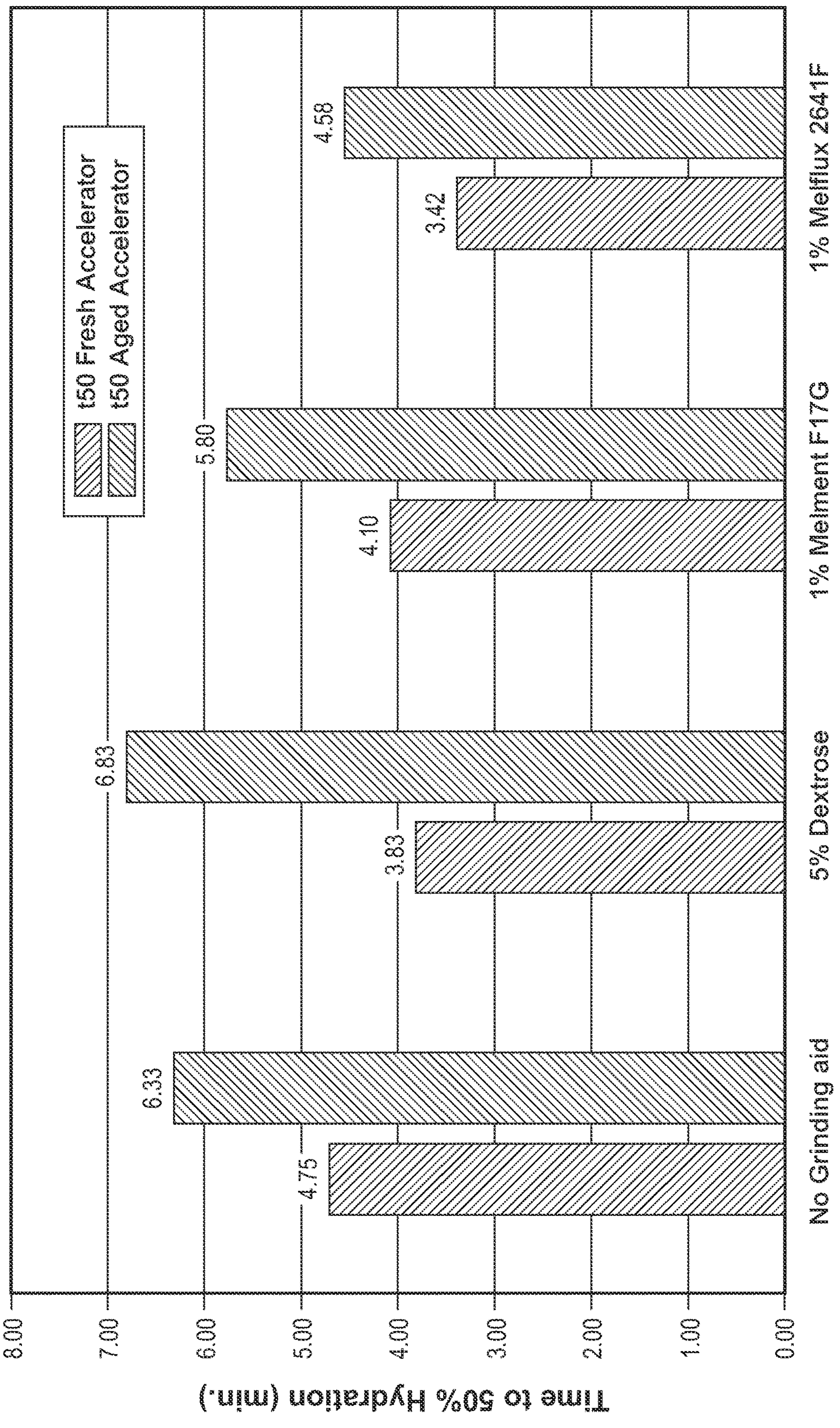
FIG. 1 is a comparative analysis comparing a time necessary to reach a 50% hydration in a gypsum slurry prepared as follows: with freshly ground landplaster or aged landplaster ("no grinding aid bars"); with freshly ground HRA containing 5% dextrose or aged ground HRA containing 5% dextrose ("5% dextrose bars"); with a first freshly ground accelerator according to this disclosure or a first aged accelerator according to this disclosure ("1% Melment F17G"), or a second freshly ground accelerator according to this disclosure or a second aged accelerator according to this disclosure ("1% Melflux 2641").

In one aspect, this disclosure relates to a gypsum set accelerator which accelerates a hydration reaction of calcium sulfate hemihydrate into calcium sulfate dihydrate crystals, as shown in the following equation:

$$CaSO_4 \cdot \frac{1}{2}H_2O + 3/2H_2O \rightarrow CaSO_4 \cdot 2H_2O$$

In this disclosure, the term "calcined gypsum" may be used interchangeably with calcium sulfate hemihydrate, stucco, calcium sulfate semi-hydrate, calcium sulfate half-hydrate or plaster of Paris.

In this disclosure, the term "gypsum" includes naturally mined gypsum (ore), landplaster as well as synthetic gypsum. The term "gypsum" may be used interchangeably with the term "calcium sulfate dihydrate."

In this disclosure, a powder, a compound, a composition or mixture may be referred to as "dry." In this disclosure "dry" means that no water was added to the composition or mixture. Nevertheless, dry powder or dry mixture may have some moisture content. For example, dry gypsum or the dry gypsum set accelerator may have a moisture content of about 1 wt % or less, about 0.05 wt % or less, or about 0 wt %.

In this disclosure, the term "about" means a range of plus/minus 5% of the value. For example, about 100 means 100±5.

In this disclosure, the term "wt %" means percentage by weight.

The gypsum set accelerator according to this disclosure is a dry-milled mixture comprising calcium sulfate dihydrate co-ground with one or more of the following compounds: a polycarboxylic ether (PCE) and/or a sulphonated melamine polycondensate (SMP), wherein the PCE and/or SMP acts as a grinding aid. The PCE and/or SMP is used in powder form.

In some preferred embodiments, the set accelerator may comprise from about 0.1 to about 5 parts by weight of a PCE and/or SMP in powder form per 100 parts by weight of calcium sulfate dihydrate and preferably, from about 1 to about 2 parts by weight of one or more PCEs and/or SMPs per 100 parts by weight of calcium sulfate dihydrate.

As one improvement over prior art, the gypsum set accelerator according to this disclosure does not need to contain other grinding aids, such as for example, starch, sucrose, dextrose, or any other sugar. In some preferred embodiments, the gypsum set accelerator according to this disclosure does not comprise starch, sucrose, or dextrose.

It has been unexpectedly found that the gypsum set accelerator according to this disclosure has several technical advantages over the heat resistance accelerator ("HRA") commonly used in the art. The gypsum set accelerator according to this disclosure has a better set efficiency[[,]] and a better humidity resistance. This gypsum set accelerator generates less of a buildup in a grinding mill in comparison to the HRA or freshly ground landplaster. These and other technical advantages are attributed to co-grinding a dry mixture containing, consisting essentially of or consisting of calcium sulfate dihydrate (gypsum or landplaster) with one or more dry powder polycarboxylic ethers (PCEs) and/or one or more of dry powder sulfonated melamine polycondensates (SMPs), and preferably not co-grinding the mixture with sucrose, dextrose, starch or any other sugar. The best results are achieved for mixtures, wherein from about 0.1 to about 5 parts by weight of one or more dry powder PCEs and/or SMPs are used per 100 parts by weight of calcium sulfate dihydrate (gypsum or landplaster) and preferably, from about 1 to about 2 parts by weight of one or more PCEs and/or SMPs per 100 parts by weight of calcium sulfate dihydrate (gypsum or landplaster). However, one or more PCEs and/or SMPs can be used in other concentrations as well.

In gypsum set accelerators according to this disclosure, calcium sulfate dihydrate may be sourced as gypsum and/or obtained by hydration of calcium sulfate hemihydrate. For example, calcium sulfate dihydrate may be sourced from scrap gypsum wallboard. Suitable gypsum includes natural ore and/or synthetic gypsum. In this disclosure, natural gypsum can be also referred to as landplaster. Mined gypsum (landplaster) is composed mostly of calcium sulfate dihydrate, preferably 80% or more by weight calcium sulfate dihydrate and more preferably, about 90% to 95% by weight calcium sulfate dihydrate, and may also contain impurities and inert materials which are typically found in natural gypsum ore. One preferred source for calcium sulfate dihydrate in the gypsum set accelerator according to this disclosure includes mined gypsum, such as high-grade landplaster, which is 80 or more wt % calcium sulfate dihydrate.

The gypsum set accelerator according to this disclosure may contain one or more polycarboxylic ethers (PCEs) and/or sulfonated melamine polycondensates (SMPs).

PCEs are compounds which are known in the art as dispersants for water-based gypsum slurries in high strength flooring compositions, as disclosed in U.S. Pat. No. 7,504,165, the entire disclosure of which is herein incorporated by reference.

While PCE dispersants in the cited art can be either in dry or liquid form, only dry PCEs are suitable in the gypsum set accelerators according to this disclosure. Furthermore, in the cited art, PCE dispersants are used for improving dispersion of calcined gypsum in water. To the contrary, in the gypsum set accelerators according to this disclosure, a polycarboxylic ether is used as a grinding aid that prevents aging of a dry-milled gypsum set accelerator.

Suitable PCE grinding aid compounds according to this disclosure include, but are not limited to, those described in WO 2006/133933, the entire disclosure of which is herein incorporated by reference. These are co-polymers containing polycarboxylate repeating units which may be derived from an olefinically unsaturated monocarboxylic acid comonomer, an ester or a salt thereof and/or an olefinically unsaturated sulfonic acid comonomer or a salt thereof. A first polycarboxylate repeating unit may be preferably derived from acrylic acid, methacrylic acid, crotonic acid, isocrotonic acid, allylsulfonic acid, vinylsulfonic acid and/or suitable salts thereof and alkyl or hydroxyalkyl esters thereof. A second polycarboxylate repeating unit may be derived from a monomer component that is preferably a vinyl or allyl group having a polyether residue, as described in WO 2011028817, the entire disclosure of which is herein incorporated by reference.

Suitable PCE grinding aid compounds according to this disclosure may further include, but are not limited to, co-polymers composed of at least the following 3 repeating units: a polyether repeating unit, an acrylic acid-type repeating unit and a maleic acid-type repeating unit. Preferably, co-polymers have a molecular weight of from about 20,000 to about 80,000 Daltons. More preferably, co-polymers may have a molecular weight from about 30,000 to about 50,000 Daltons. The repeating units can be present in the co-polymer in any order, including random arrangement along the polymer backbone. Suitable PCE co-polymers include those described in U.S. Pat. No. 6,777,517, the entire disclosure of which is herein incorporated by reference.

In the PCE grinding aids, the first repeating unit may be a monocarboxylic residue, preferably an acrylic acid-type unit or its derivative, shown in Formula (I) below:

Wherein:

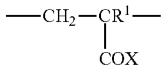

(I)

$R^1$ is a hydrogen atom or an aliphatic hydrocarbon radical having 1 to 20 carbon atoms;

X is $—O_aM$, $—O—(C_mH_{2m}O)_n—R^2$, or $—NH—(C_mH_{2m}O)_n—R^2$, wherein M is a hydrogen, a monovalent or divalent metal cation, an ammonium ion or an organic amine radical; a is ½ or 1 depending on whether M is a monovalent or divalent cation; m is 2 to 4, n is 0 to 200 and $R^2$ is a hydrogen atom, an aliphatic hydrocarbon radical having from 1 to 20 carbon atoms, a cycloaliphatic hydrocarbon radical having from 5 to 8 carbon atoms, a substituted or unsubstituted aryl radical having from 6 to 14 carbon atoms.

Preferred first repeating units include acrylic acid and methacrylic acid or their monovalent or divalent metal salts. Preferred metals are sodium, potassium, calcium or ammonium.

In the PCE grinding aids, the second repeating unit may be a vinyl ether-type repeating unit, shown in Formula (II).

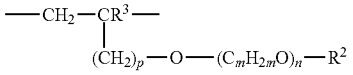

(II)

Wherein $R^2$ is as described above in connection with Formula (I) and preferably, $R^2$ is a hydrogen atom or an aliphatic hydrocarbon radical having from 1 to 5 carbon atoms and p is from 0 to 3, $R^3$ is a hydrogen atom, or an aliphatic hydrocarbon radical having from 1 to 5 carbon atoms, p is from 0 to 3, m is 2 to 4 and n is 0 to 200.

The use of polyethylene glycol monovinyl ethers (p=0 and m=2) are particularly advantageous, with n preferably being from 1 to 50.

In the PCE grinding aids, the third repeating unit may be a maleic acid-type repeating unit or its ester, as shown in Formula (III).

Wherein:

(III)

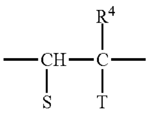

$R^4$ is a hydrogen or an aliphatic hydrocarbon radical having from 1 to 5 carbon atoms, S is a hydrogen atom, a carboxylic acid, the acid salt containing a monovalent or divalent metal cation, an ammonium ion or an organic amine radical or the acid ester of an aliphatic hydrocarbon radical having from 3 to 20 carbon atoms, a cycloaliphatic hydrocarbon radical having from 5 to 8 carbon atoms or an aryl radical having from 6 to 14 carbon atoms, T is an acid ester of an aliphatic hydrocarbon radical having from 3 to 20 carbon atoms, a cycloaliphatic hydrocarbon radical having from 5 to 8 carbon atoms or an aryl radical having from 6 to 14 carbon atoms.

Preferred third repeating units include di-n-butyl maleate, fumarate and/or mono-n-butyl maleate.

The three repeating units can be present in a PCE co-polymer in any order, including random arrangement along the polymer backbone. In some preferred PCE grinding aids according to this disclosure, the ratio of the acid-containing repeating units to the polyether-containing repeating unit is selected such that a charge density of the co-polymer is in the range from about 300 to about 3000 μequiv charges/g co-polymer and more preferably in the range from about 600 to about 2000 μequiv charges/g co-polymer.

Useful commercially available PCE grinding aids include polycarboxylate ether MELFLUX 2641 (BASF corporation, NJ, USA) which is a powder produced by spray-drying a modified polyether carboxylate and other commercially available powder polycarboxylate ethers which are in some preferred embodiments are co-polymers that contain oxyalkylene-alkyl ethers, maleic acid and acrylic acid repeating units. Preferably, co-polymers have a molecular weight of from about 20,000 to about 80,000 Daltons. More preferably, co-polymers may have a molecular weight from about 20,000 to about 50,000 Daltons. The repeating units can be present in the co-polymer in any order, including random arrangement along the polymer backbone. Preferably, a ratio of the acid-containing repeating units to the polyether-containing repeating unit is selected such that a charge density of the co-polymer is in the range from about 300 to about 3000 μequiv charges/g co-polymer and more preferably in the range from about 600 to about 2000 μequiv charges/g co-polymer.

The sulphonated melamine polycondensates ("SMPs") are known in the art as dispersants for water-based gypsum slurries, as disclosed in EP 1379479, the entire disclosure of which is herein incorporated by reference. These are anionic polymeric dispersants produced by a polycondensation chemical reaction. The condensation number (n) may be in the range 50-60 giving a molecular weight between 12,000 and 15,000. Preferably, each repeating unit contains one sulphonate group.

Examples of suitable sulphonated melamine polycondensates include products under the brand name Melment F10®, Melment F15®, Melment F15G®, Melment F17G®, Melment F245®, all produced by SKW Chemicals Inc, USA; and Meladyne™ from Handy Chemicals, Canada; although others are available. The SMP grinding aid is used in powder form. As is known in the art, the SMP products may comprise salts such as Meladyne™, or melamine sulphonate, which is a sodium salt of polymelamine sulphonic acid.

In another aspect, this disclosure relates to methods for producing the gypsum set accelerator according to this disclosure. Preferred methods are dry-mill methods and comprise co-grinding calcium sulfate dihydrate which may be sourced as gypsum, landplaster, synthetic gypsum and/or rehydrated calcined gypsum with the PCE and/or SMP grinding aid. Preferably, calcium sulfate dihydrate is mixed with the PCE and/or SMP in a weight ratio in the range from 0.1 to 5 parts by weight of the PCE/SMP per 100 parts by weight of calcium sulfate dihydrate, and more preferably in the range from 1 to 2 parts by weight of the PCE/SMP per 100 parts by weight of calcium sulfate dihydrate. Preferably, gypsum is supplied as particles with a median particle size in the range from about 100 microns to about 250 microns, as determined by a laser scattering analysis.

Preferably, the method may be performed without using other grinding aids, and most preferably without adding starch or sugar.

Any grinding apparatus suitable for grinding dry mixtures can be used. A preferred grinding apparatus is a ball mill, including as described in U.S. Pat. No. 3,573,947, the entire disclosure of which is herein incorporated by reference.

In the co-grinding methods according to this disclosure, a ball mill may be a hollow cylindrical chamber rotating about its axis. The axis of the ball mill may be either horizontal or at an angle to the horizontal axis. The ball mill is partially filled with balls which act as the grinding media. The grinding balls may be composed of any suitable material, including, but not limited to, one or more metals and/or one or more ceramics. In some preferred embodiments, the grinding balls comprise or consist essentially of stainless steel.

A size and density of the grinding balls determine, at least in part, the median particle size of the produced gypsum set accelerator. Preferably, the grinding balls may have an average diameter in the range from about 10 mm to about 50 mm. Preferably, a density may be in the range from about 2 $g/cm^3$ to about 6 $g/cm^3$ or more. After co-grinding is completed, the gypsum set accelerator may contain ground particles with the particle size distribution with a median particle size in the range from about 10 μm to about 80 μm, and more preferably from about 20 μm to about 60 μm.

The mill chamber may be water-cooled and/or air-conditioned in order to prevent over-heating of the co-grinding mixture, and/or the chamber may be vented in order to remove moisture from the mill. A de-humidifier can be used as well in order to remove humidity from the mill chamber.

Grinding methods according to this disclosure may be performed either continuously or in a batch process.

Figure 2:
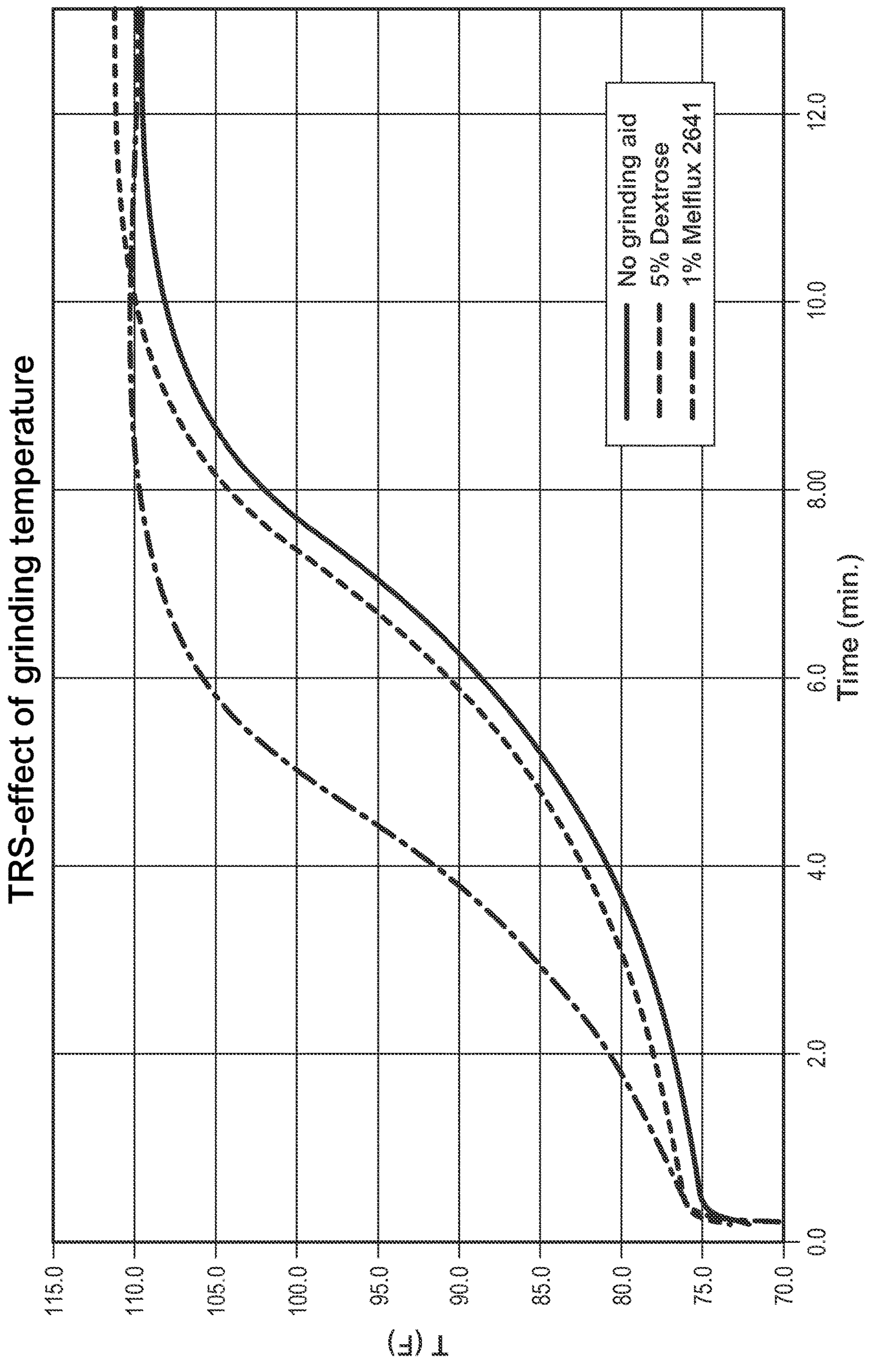
FIG. 2 is a comparative analysis for different gypsum set accelerators as follows: a setting reaction for a calcined gypsum slurry prepared with an accelerator according to this disclosure (curve I), with an HRA (curve II); or ground landplaster (curve III), where all accelerators were prepared in a ball mill at 160° F.

It is preferred that the co-grinding is performed at a temperature in the range that does not exceed 160° F., e.g., in the range from about 60° F. to about 160° F., or more preferably, in the range from about 68° F. to about 100° F. As shown in FIG. 2, one of the technical advantages of the present gypsum set accelerator is that it can be satisfactory co-ground without substantially diminishing its efficiency at temperatures higher than those suitable for co-grinding HRA. Another technical advantage of the gypsum set accelerator according to this disclosure is that it is less susceptible to decreasing its efficiency if it is co-ground or stored under humid conditions, e.g., humidity 60% or higher. In some embodiments, the gypsum set accelerator according to this disclosure may be stored under humid conditions, for example wherein the humidity is in the range from about 20% to about 80% and more preferably, at about 30% to about 50%, and still be functional as a setting accelerator.

The gypsum set accelerator can be prepared using dry gypsum in a batch process or in continuous process. Co-grinding can occur for any suitable period of time and in order to achieve the gypsum set accelerator with particles of desired size. In some embodiments, co-grinding may take place for a period of time from about 5 minutes to about 2 hours, and more preferably from about 5 minutes to about 1 hour, and most preferably from about 5 minutes to about 20 minutes. In some embodiments, the starting material of calcium sulfate dihydrate for co-grinding, e.g., as landplaster, may be supplied as particles with an average particle size of about 100 μm to about 200 μm which is the co-ground with the PCE and/or SMP grinding aid.

In yet another aspect, this disclosure relates to various gypsum products formed from a gypsum slurry prepared with the gypsum set accelerator according to this disclosure. Such products may include, but are not limited to, wallboard, fiberboard, molded gypsum items and any other items which are formed from a gypsum slurry comprising at least calcined gypsum (stucco), water and any other additives as conventionally used with gypsum slurries, depending on what product is to be made from the gypsum slurry. Examples of products include wallboard, fiberboards, cementitious panels, fiberglass-mat panels, floor underlayment, molded (sculptured) items, floor underlayment and many others.

It has been discovered that the gypsum set accelerator according to this disclosure reduces the set time of an aqueous gypsum slurry more efficiently than HRA or ground landplaster. The dry gypsum set accelerator may be added directly to a gypsum slurry right after it has been produced by the co-grinding method, or the gypsum set accelerator may be aged for at least an hour or more before it is used with a gypsum slurry. It has been unexpectedly discovered that as is shown by a comparative analysis in FIG. 1, the gypsum set accelerator according to this disclosure reduces the set time (measured as a time to 50% hydration) more efficiently than HRA and furthermore, the aged gypsum set accelerator retains its efficiency better than HRA when aging even under humid conditions with humidity of 70% or higher, e.g., 90%.

In this disclosure, the aged gypsum set accelerator means that prior to its use, the gypsum set accelerator according to this disclosure was stored for a period of time, e.g., for minutes, hours or even days. The storage may be under any temperature and humidity, preferably as it typically can be found at a manufacturing plant. For example, a temperature may be in the range from about 10° C. to 25° C., depending on a season. Humidity may depend on a location and season. For example, it is typically more humid in Florida, USA than in California, USA during the summertime. Some storage conditions may include a humidity in the range from about 20% to about 90%, and more commonly from about 30% to about 80%.

The gypsum set accelerator can be added to a gypsum slurry in any amount sufficient for obtaining the desired set time of a gypsum slurry. Preferred setting times include at least 50% hydration of the gypsum slurry within 20 minutes and more preferably within 10 minutes or even 5 minutes. In some embodiments, the gypsum set accelerator may be used in an amount from about 0.1 wt % to about 5 wt % of the gypsum set accelerator, preferably from about 0.1 wt % to about 1 wt % of the gypsum set accelerator, measured as a wt % from stucco weight, e.g., from about 0.1 g to about 5 g of the gypsum set accelerator per 100 grams of stucco. The gypsum set accelerator can be added to the gypsum slurry right after the gypsum set accelerator was produced by co-grounding (referred in this disclosure as a freshly co-ground set accelerator), or the gypsum set accelerator can be aged before it is added to a gypsum slurry. Being able to use an aged gypsum set accelerator is one of the technical advantages of the present gypsum set accelerator as it saves time, energy and reduces manufacturing costs.

The gypsum set accelerator according to this disclosure can be used with any water-based gypsum slurry. Such gypsum slurries include, but are not limited to, gypsum slurries with a water/stucco ratio in the range from about 0.4 to about 1.5.

A gypsum slurry according to this disclosure may comprise one or more additives conventionally used in gypsum slurry formulations. Non-limiting examples of some additives are provided below and include binders, fibers, set accelerators, set retarders, dehydration inhibitors, adhesives, bulking agents, dispersants, thickeners, bactericides, fungicides, pH adjusters, leveling or non-leveling agents, water repellants, colorants, aqueous foams or any combination thereof.

Depending on a product to be made, a gypsum slurry may be formulated with one or more starches and/or a polymeric binder. If a starch is used, it may include raw starch, hydroxyethylated starch, acid-modified starch, pregelatinized starch or any combination thereof. In some embodiments, starch may include pregelatinized starch which can be obtained by cooking and gelatinizing raw starch in water, for example at a temperature of about 185° F., or higher. A pregelatinized starch can be added to the gypsum slurry in a dry form and/or in a pre-dispersed liquid form. Commercially available pregelatinized starches include corn flour starch. Suitable starches may also include acid-modified starch, e.g., acid-modified corn starch and/or hydroxyethylated starch. Suitable non-gelatinized starches may include commercially available wheat starch. The gypsum slurries and gypsum cores of this disclosure may comprise from 0.3% to 5% of starch, preferably from about 0.5% to about 2% of starch by weight of calcined gypsum.

The gypsum cores and gypsum slurries according to this disclosure may comprise fibers. Depending on an application, fibers may include mineral wool fibers, glass fibers, carbon fibers, cellulose fibers or any combination thereof. Some preferred embodiments include those in which glass fibers, preferably E-glass fibers are used. Typically, suitable glass fibers may have an average length in the range from 0.5 to 0.76 inches and a diameter of about 11 to about 17 microns. The gypsum slurries and gypsum cores of this disclosure may comprise from about 0.1% to about 2% of fibers by weight of calcined gypsum, preferably from about 0.5% to about 1% of fibers by weight of calcined gypsum.

Depending on a product to be formulated, the gypsum slurries may comprise calcium carbonate, mica, one or more clays, perlite, vermiculite, cement, fly ash, glass microspheres and/or other components typically used for improving one or more technical features of a gypsum-containing product. These additives may be used in any suitable amounts, for example from about 0.1 wt % to about 70 wt % by weight of calcined gypsum in the gypsum slurry, depending on the additive and its conventional amounts in a gypsum slurry.

The gypsum cores and gypsum slurries according to this disclosure may comprise one or more of phosphate compounds which are used for increasing gypsum core strength, especially while a gypsum panel is still setting in order to improve wet (green) strength and sag resistance of the gypsum panel. Suitable phosphate compounds include cyclic polyphosphates, condensed phosphoric acids, and monobasic salts or monovalent ions of orthophosphates. Particularly preferred phosphate compounds include, but are not limited to, trimetaphosphate salts and tetrametaphosphate salts. Particularly preferred phosphate compounds include sodium trimetaphosphate ("STMP"), potassium trimetaphosphate, ammonium trimetaphosphate, sodium hexametaphosphate, tetrapotassium tripolyphosphate, ammonium polyphosphate, aluminum trimetaphosphate or any combination thereof. The gypsum slurries and gypsum cores of this disclosure may comprise from about 0.05% to about 1% of one or more phosphate compounds by weight of calcined gypsum, preferably from about 0.1% to about 1% of one or more phosphate compound by weight of calcined gypsum.

The gypsum cores and gypsum slurries according to this disclosure may comprise one or more dispersants. Suitable dispersants include naphthalensulfonates and derivatives, including sodium and/or calcium naphthalenesulfonate. Other suitable dispersants include polycarboxylate dispersants and in particular, polycarboxylic ethers, including those described in U.S. Pat. Nos. 5,798,425, 6,777,517 and 7,767,019. Some gypsum slurries may also comprise one or more lignosulfonates. The gypsum slurries of this disclosure may comprise from about 0.05% to about 2% of one or more dispersants by weight of calcined gypsum, preferably from about 0.1% to about 1% of one or more dispersants by weight of calcined gypsum.

Suitable set retarding agents delay a hydration reaction of calcined gypsum. Such set retarding agents may include, but are not limited to, commercially available protein retarder SUMA, diethylenetriamine pentaacetic acid (DTPA), tartaric acid, citric acid, maleic acid or salts thereof, including in particular sodium citrate and/or potassium bitartrate (cream of tartar), or any combination thereof. A set retarding agent can be used in a small amount, for example in an amount in the range from about 0.01% to about 1.5% by weight of calcined gypsum, preferably in an amount in the range from about 0.05% to about 0.5% by weight of calcined gypsum in the gypsum slurry.

In order to produce a light-weight gypsum panel, a gypsum slurry may be blended with foam. For example, a gypsum slurry may be mixed with a foaming agent supplied as a foam from a foam generator, as for example was described in U.S. Pat. Nos. 5,643,510 and 5,683,635, the disclosures of which are incorporated by reference.

Gypsum slurries mixed with a foam may produce a gypsum core comprising air voids. Some gypsum cores according to this disclosure may contain air voids. Some gypsum cores according to this disclosure may contain air voids with a diameter in the range from about 75 micrometers to about 300 micrometers. A diameter of voids on average, an average number of voids per a cubic foot of the gypsum core and the distribution of the voids through the thickness of the gypsum core can be adjusted as may be needed for maintaining the targeted gypsum core density and strength by adjusting a blending ratio of a stable foaming agent comprising an alkyl chain containing between 8 and 12 carbons and an ethoxy group having a length of 1 to 4 units (stable soap) to an unstable foaming agent comprising unethoxylated soap with an alkyl chain length of 6 to 16 carbon units (unstable soap). It should be further appreciated that at least in some other embodiments suitable gypsum cores with air voids according to this disclosure can be made without co-blending stable and unstable foaming agents and/or only one type of the foaming agent, e.g., stable soap, can be used. Suitable foaming agents may comprise stable soap, unstable soap, or any combination hereof.

Various commercially available foaming agents can be used, including, but not limited to, foaming agents (surfactants, soaps) comprising sodium dodecyl sulfate, magnesium dodecyl sulfate, ammonium dodecyl sulfate, potassium dodecyl sulfate, sodium decyl sulfate, alkoxylated alkyl sulfate surfactants, sodium laureth sulfate, potassium laureth sulfate, magnesium laureth sulfate, ammonium laureth sulfate, or any mixtures thereof.

In some embodiments, a foaming agent or any blend of foaming agents may be used in any suitable amount to produce a gypsum core with a desired density and strength. In some embodiments, from about 0.01% to about 0.5% of a foaming agent can be used by weight of calcined gypsum in the gypsum slurry.

If a water-repellant product is made, a gypsum slurry may comprise one or more water-repellent agents. Such agents may include siloxane. In these embodiments, a polymerizable siloxane, preferably as an emulsion which may comprise an emulsifying agent, may be added to a gypsum slurry. In order to improve polymerization of siloxane, a catalyst can be also added to the gypsum slurry. Suitable siloxane formulations and catalysts such as magnesium oxide, Class C fly ash, dead-burned magnesium oxide as disclosed in U.S. Pat. Nos. 7,892,472 and 7,803,226, the entire disclosures of which are herein incorporated by reference.

Preferred siloxanes include a fluid polymerizable linear siloxane comprising a repeating unit with the general formula $R^2SiO$, wherein each of the two Rs independently represents a saturate or unsaturated mono-valent hydrocarbon radical or hydrogen. Preferably, siloxane is a hydrogen-modified siloxane. Most preferably, a siloxane is an alkyl hydrogen siloxane, and most preferably, methyl hydrogen siloxane. In some embodiments, a gypsum slurry may comprise siloxane in an amount from about 0.3% to about 2% by weight of calcined gypsum.

Referring to FIGS. 1 and 2, they report results from a 50% hydration test which may be referred in this disclosure as the Temperature Rise Set (TRS) test. For the 50% hydration test, a gypsum slurry is formulated with stucco, water, the gypsum set accelerator according to this disclosure, or a control gypsum set accelerator, and optionally with one or more additives. The gypsum slurry is then poured into a cup which is then placed into an insulated styrofoam container in order to minimize heat transfer to the environment. A temperature probe is placed into the middle of the gypsum slurry, and the temperature is recorded every 5 seconds. The setting reaction is exothermic, and its temperature rises exponentially as the reaction proceeds and the gypsum slurry sets. Eventually, the reaction reaches its maximum temperature at which the reaction curve plateaus. A time to 50% hydration is determined as the time needed to reach a half-way between the minimum temperature at the beginning of the TRS test and the maximum temperature recorded for the setting reaction during the TRS test, as can be seen in FIG. 2.

As is shown in FIG. 1, a gypsum slurry made with the set accelerator according to this disclosure reaches a 50% hydration time sooner than a gypsum slurry prepared with HRA or landplaster. During manufacturing of a gypsum product, this may result in needing less time before a gypsum-containing product is solid enough to be cut to a size and/or handled. This may provide significant manufacturing savings in part because a forming panel is kept on conveyor for a shorter period of time before the panel is firm enough to be cut and moved to a kiln. Thus, a manufacturing conveyer can be operated at a higher speed with more panels being made per an hour during which the conveyor is in operation. This improves manufacturing efficiency and provides electricity and cost savings per each panel being made on the conveyor, transforming a manufacturing process into being more environmentally friendly.

Furthermore, the gypsum set accelerator according to this disclosure, when aged, retains its efficiency better than the control gypsum set accelerators. This conclusion is further supported by FIG. 1, which reports a shorter 50% hydration time for the set accelerator according to this disclosure in comparison to HRA or landplaster.

Yet another technical advantage of the gypsum set accelerator according to this disclosure is reported in FIG. 2, which is a comparative analysis for different gypsum set accelerators as follows: a setting reaction for a calcined gypsum slurry prepared with the gypsum set accelerator according to this disclosure (curve I), with an HRA (curve II); or ground landplaster (curve III). For this analysis, the set accelerator according to this disclosure or control set accelerators were produced by grinding in a ball mill at 160° F. The set accelerators were then used in a 50% hydration test ("the TRS" test). As reported in FIG. 2, the gypsum set accelerator according to this disclosure retains its efficiency after being exposed to grinding conditions at an elevated temperature better than control set activators, producing less build up in a grinding mill and allowing the grinding mill to operate longer between necessary clean ups.

In yet another aspect, this disclosure relates to methods for manufacturing gypsum-containing products. Examples of such products include wallboard, fiberboards, cementitious panels, fiberglass-mat panels, floor underlayment, molded (sculptured) items, floor underlayment and many others.

Preferred gypsum-containing products according to this disclosure include gypsum panels which can be manufactured on a conveyor. Some gypsum panels may include those in which a gypsum core is sandwiched between two cover sheets. Suitable cover sheets include paper cover sheets and fiberglass mats among others. Preferred gypsum panels include wallboard wherein a gypsum core is sandwiched between two paper cover sheets.

Figure 3:
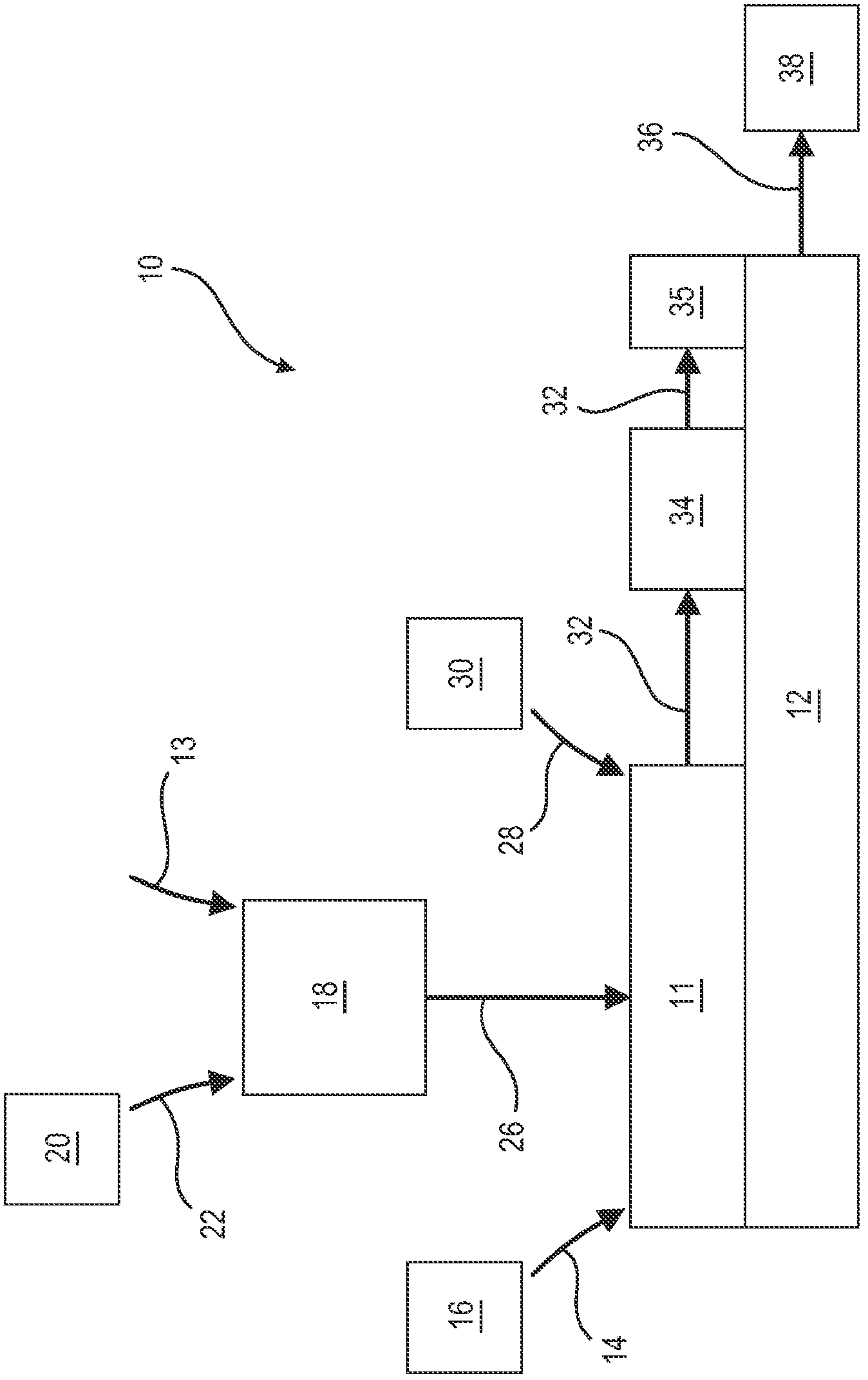
FIG. 3 is a flow chart of a manufacturing process for a gypsum panel made with the gypsum set accelerator according to this disclosure.

Referring to FIG. 3, in some preferred manufacturing methods for producing a gypsum panel, e.g., wallboard, the method can be performed with a manufacturing assembly, generally 10, which comprises a moving conveyor (12).

A first cover sheet (14) which may be referred to as the face cover sheet is fed from a first roll (16) onto a wet portion (11) of the moving conveyor (12). In making a wallboard, cover sheets are preferably paper cover sheets.

Dry and wet components (13), including calcined gypsum, water, the gypsum set accelerator, and other additives, if used, are fed into a gypsum slurry mixer (18) wherein the components (13) are mixed with agitation into a gypsum slurry. At least some of dry components, e.g., the gypsum set accelerator and calcined gypsum may be premixed before these dry components are mixed with water and other liquid components. In some embodiments, the gypsum slurry mixer (18) may be in communication with a ball mill (20) through a conduit (not shown) such that a freshly co-ground gypsum set accelerator (22) may be released from the ball mill (20) into the gypsum slurry mixer (18). While the gypsum set accelerator (22) may be used as freshly ground in some embodiments, the gypsum set accelerator (22) can be aged before it is added to a gypsum slurry.

The gypsum slurry mixer (18) may include a discharge conduit (not shown) through which a gypsum slurry (26) is released from the gypsum slurry mixer (18) onto the first cover sheet (14) moving on the wet portion (11) of the conveyor (12). The discharged gypsum slurry (26) is spread over the first cover sheet (14) and is covered with a second cover sheet (28) which can be referred to as the back cover sheet, fed from a roll (30), forming a sandwich structure (ribbon panel precursor, 32) that continues moving on the conveyor (12) toward a forming station (34) of the conveyor (12), wherein the panel precursor (32) is formed into a desired thickness and continues moving on the conveyor (12) to a knife section (34) of the conveyor (12) wherein the panel precursor (32) is cut into gypsum panels (36) which can be now moved to a kiln (38) wherein the gypsum panels (36) are dried at an elevated temperature, e.g., in the range from about 110° F. to about 450° F.

The gypsum set accelerator according to this disclosure decreases a 50% hydration time of a gypsum slurry with a technical advantage of permitting for the ribbon precursor (32) being ready to be cut into gypsum panels (36) sooner and therefore, the ribbon panel precursor (32) may reach the knife section (34) of the conveyor in a shorter period of time. This manufacturing process becomes more efficient because a shorter time may be needed on a conveyor before a gypsum panel (36) can be handled and cut.

A further description will now be provided by the following non-limiting examples.

Example 1. Preparation of Gypsum Set Accelerator

One gypsum set accelerator according to this disclosure was prepared by co-grinding 50 g of landplaster with 0.5 gram of MELFLUX 2641 (a polycarboxylate ether available from BASF corporation, NJ, USA) in a bench scale planetary ball mill for 10 minutes.

Another gypsum set accelerator according to this disclosure was prepared by co-grinding 50 g of landplaster with 0.5 gram of MELMENT F17G (sulphonated polycondensation product based on melamine, available from BASF corporation, NJ, USA) in a bench scale planetary ball mill for 10 minutes.

Example 2. Preparation of a Gypsum Slurry with the Gypsum Set Accelerator

A gypsum slurry was prepared by mixing together 200 g stucco, 200 g water and 1 g of one of the two accelerators: MELMENT F17G (a sulphonated polycondensation product based on melamine, available from BASF corporation, NJ, USA) or MELFLUX 4261F (a polycarboxylate ether available from BASF corporation, NJ, USA).

A first control gypsum slurry was prepared by mixing together 200 g stucco, 200 g water and 1 g of landplaster ground without a grinding aid. A second control gypsum slurry was prepared by mixing together 200 g stucco, 200 g water and 1 g of HRA which was prepared by co-grinding landplaster with dextrose (5% dextrose and 95% landplaster).

Example 3. Measuring a 50% Hydration Time

Gypsum slurries were prepared as described in Example 2. 200 grams of each gypsum slurry was then poured in a cup and a temperature probe was inserted into the gypsum slurry. The temperature probe measured a temperature of the setting gypsum slurry by the predetermined intervals, e.g., every several seconds. These temperature measurements were transmitted to a computer, wherein a software program calculated a time from the initial temperature measurement to the final temperature measurement wherein there was no further increase in temperature detected, and then calculated a 50% hydration time. Results of these measurements are shown in FIGS. 1 and 2.

We claim:

1. A gypsum set accelerator, wherein the gypsum set accelerator is a dry-milled mixture comprising calcium sulfate dihydrate co-ground with one or more of the following: a polycarboxylate ether (PCE) and/or sulfonated melamine polycondensate (SMP), wherein the polycarboxylate ether is a co-polymer composed of oxyalkylene-alkyl ether, maleic acid and acrylic acid repeating units, and having a molecular weight in the range from 20,000 to 80,000 Daltons;

wherein the gypsum set accelerator is an aged gypsum set accelerator and comprises from 0.1 to 5 parts by weight of the PCE and/or SMP per 100 parts by weight of calcium sulfate dihydrate; and wherein the aged gypsum set accelerator retains set-accelerating efficiency when stored under humid conditions with humidity of 70% or higher.

2. The gypsum set accelerator of claim 1, wherein the gypsum set accelerator comprises from 1 to 2 parts by weight of the PCE and/or SMP per 100 parts by weight of calcium sulfate dihydrate.

3. The gypsum set accelerator of claim 1, wherein calcium sulfate dihydrate is sourced as mined gypsum, synthetic gypsum, re-hydrated calcined gypsum and/or scrap gypsum wallboard.

4. The gypsum set accelerator of claim 1, wherein the co-polymer has a charge density in the range from about 300 to about 3000 μequiv charges/g co-polymer.

5. The gypsum set accelerator of claim 1, wherein the co-polymer has a charge density in the range from about 600 to about 2000 μequiv charges/g co-polymer.

6. The gypsum set accelerator of claim 1, wherein the gypsum set accelerator does not contain starch or sugar.

7. A method for producing the gypsum set accelerator according to claim 1, the method comprising:

mixing a dry mixture comprising calcium sulfate dihydrate and one or more of the following: a polycarboxylic ether (PCE) and/or sulfonated melamine polycondensate (SMP), wherein the polycarboxylate ether is a co-polymer composed of oxyalkylene-alkyl ether, maleic acid and acrylic acid repeating units, and having a molecular weight in the range from 20,000 to 80,000 Daltons; wherein calcium sulfate dihydrate is mixed with the PCE and/or SMP in a weight ratio in the range from 1 to 5 parts by weight of the PCE and/or SMP per 100 parts by weight of calcium sulfate dihydrate; and i) co-grinding the dry mixture in a ball mill.

8. The method of claim 7, wherein calcium sulfate dihydrate is sourced as gypsum, gypsum, landplaster, synthetic gypsum and/or rehydrated calcined gypsum.

9. The method of claim 7, wherein the co-grinding step is performed without adding starch or sugar.

10. The method of claim 7, wherein the co-grinding step is performed at a temperature in the range from 60° F. to 160° F.

11. The method of claim 7, wherein the ball mill contains grinding balls with an average diameter in the range from about 10 mm to about 50 mm.

12. The method of claim 7, wherein steps (i) and (ii) are carried out sequentially or simultaneously.

13. The method of claim 7, wherein the co-grinding step is performed for a period of time in the range 5 minutes to 2 hours.

14. A gypsum slurry comprising at least calcined gypsum, water and the gypsum set accelerator of claim 1.

15. The gypsum slurry of claim 14, wherein the gypsum slurry is further characterized by one or more of the following features:

1) the gypsum set accelerator is in an amount in the range from about 0.1 wt % to about 5 wt % calculated based on the weight of calcined gypsum;

2) a water/stucco ratio is in the range from about 0.4 to about 1.5;

3) The gypsum slurry contains one or more additives; and/or

3) The gypsum set accelerator was aged before it was added to a gypsum slurry.

16. The gypsum set accelerator of claim 1, wherein the gypsum set accelerator comprises SMP.

17. A method for manufacturing a gypsum-containing product, the method comprising:

i) mixing a dry mixture comprising calcium sulfate dihydrate and one or more of the following: a polycarboxylic ether (PCE) and/or SMP, wherein the polycarboxylate ether is a co-polymer composed of oxyalkylene-alkyl ether, maleic acid and acrylic acid repeating units, and having a molecular weight in the range from 20,000 to 80,000 Daltons; wherein calcium sulfate dihydrate is mixed with the PCE in a weight ratio in the range from 0.1 to 5 parts by weight of the PCE and/or SMP per 100 parts by weight of calcium sulfate dihydrate;

ii) co-grinding the dry mixture in a ball mill and producing a freshly ground gypsum set accelerator;

iii) mixing at least calcined gypsum, water and the gypsum set accelerator obtained in step ii) into a gypsum slurry with a water/stucco ratio in the range from about 0.4 to about 1.5, wherein the gypsum set accelerator is mixed into the gypsum slurry either as a freshly ground gypsum set accelerator or after the gypsum set accelerator was aged, wherein the aged gypsum set accelerator retains set-accelerating efficiency when stored under humid conditions with humidity of 70% or higher, and wherein the gypsum set accelerator is added to the gypsum slurry in an amount in the range from about 0.1 wt % to about 5 wt % calculated based on the weight of calcined gypsum; and iv) forming a gypsum product from the gypsum slurry.

18. The method of claim 17, wherein forming of the gypsum product includes spreading the gypsum slurry on a first cover sheet moving on a conveyor and covering the spread gypsum slurry with a second cover sheet as the gypsum slurry is conveyed on the first cover sheet.

* * * * *